United States Patent
Ogata

[11] Patent Number: 5,612,589
[45] Date of Patent: Mar. 18, 1997

[54] COLOR FILTER SUBSTRATE AND MAKING METHOD THEREFOR

[75] Inventor: Kazuo Ogata, Kyoto, Japan

[73] Assignee: Matsushita Electric Industrial Co., Ltd., Osaka, Japan

[21] Appl. No.: 529,787

[22] Filed: Sep. 18, 1995

Related U.S. Application Data

[63] Continuation of Ser. No. 131,533, Oct. 1, 1993, abandoned.

[30] Foreign Application Priority Data

Mar. 18, 1993 [JP] Japan .................................. 5-058975

[51] Int. Cl.⁶ .................................................. H01J 29/10
[52] U.S. Cl. .......................... 313/461; 313/474; 349/106
[58] Field of Search .................................... 313/466, 461, 313/470, 474, 478, 112, 110; 348/740, 790, 791, 766, 761, 751; 359/66, 68, 588, 589; 250/208.1

[56] References Cited

U.S. PATENT DOCUMENTS

| | | | |
|---|---|---|---|
| 3,247,412 | 4/1966 | Barneveld et al. | 313/470 |
| 3,654,505 | 4/1972 | Davis | 313/474 |
| 3,879,632 | 4/1975 | Dietch | 313/474 |
| 4,271,247 | 6/1981 | Morrell | 313/470 |
| 5,081,394 | 1/1992 | Morishita et al. | 313/474 |
| 5,223,962 | 6/1993 | Shioji et al. | 359/67 |
| 5,420,708 | 5/1995 | Yokoyama et al. | 359/68 |

FOREIGN PATENT DOCUMENTS

| | | | |
|---|---|---|---|
| 0122168 | 10/1984 | European Pat. Off. | G02F 1/13 |
| 62-85202 | 4/1987 | Japan | G02B 5/20 |
| 4030118 | 2/1992 | Japan | G02F 1/335 |

OTHER PUBLICATIONS

Mizuno, Katsuhiko and Okazaki, Satoshi, "Printing Color Filter for Active Matrix Liquid–Crystal Display Color Filter," *Japanese Journal of Applied Physics*, vol. 30, No. 11B, Nov., 1991, pp. 3313–3317.

*Primary Examiner*—Edward L. Coles, Sr.
*Assistant Examiner*—Jerome Grant, II
*Attorney, Agent, or Firm*—Panitch Schwarze Jacobs & Nadel, P.C.

[57] ABSTRACT

In a color filter substrate including a black matrix and RGB patterns, each of the RGB patterns provided on the black matrix is disposed along a direction oblique to a reference direction of the black matrix which is defined by sides of apertures formed in the black matrix.

7 Claims, 5 Drawing Sheets

5,612,589

COLOR FILTER SUBSTRATE AND MAKING METHOD THEREFOR

This application is a continuation of Ser. No. 08/131,553, filed Oct. 1, 1993 now abandoned.

FIELD OF THE INVENTION AND RELATED ART STATEMENT

1. Field of the Invention

The present invention relates to a color filter substrate used for a liquid crystal display device etc. and its making method.

2. Description of the Related Art

A color filter substrate for display devices etc. consists of RGB materials and a black matrix. In the conventional art for making the color filter substrate, the black matrix is formed by a photolithograph method using a metal thin film such as chrome, a photolithograph method using a black pigment resist or a printing method using an original plate of the screen printing, intaglio printing, relief printing or planography. Also, the RGB materials are formed by the photolithograph method using the pigment resist, the printing method or an electrodeposition method etc.

One or more methods of the above-mentioned plural methods have been selected or combined with each other to satisfy the necessity of size, configuration, preciseness of position, cost and working efficiency.

FIG. 11 is a plane view showing the conventional color filter which has been used for a long while. This color filter is formed by the combination of a black matrix 7 of metal thin film and RGB dot patterns 8. The matrix film 7 is made by the photolithograph method using a chrome thin film. The RGB dot patterns 8 are made by the photolithograph method using a pigment resist. However, due to its high making costs, another making method was expected to reduce costs.

In response to the above-mentioned needs, such a method is employed that the black matrix is made by a photolithograph method using a black pigment resist. This method was expected to reduce costs by a combination with the printing method and the electrodeposit method which had a high productivity as a method for forming RGB materials.

FIGS. 8–10 are illustrations showing disposition of the RGB materials having the form of stripe, delta (triangle) and diagonal mosaic, respectively. Since the display device for office automation equipments such as a personal computer mainly necessitates to display characters only, the stripe type disposition having the linearly-disposed RGB materials is usable. However, the display device for the audio-visual equipments such as a TV set necessitates to obtain a soft and fine picture for displaying moving portrait etc. Therefore, both the delta disposition (FIG. 9) having a triangle disposition of the RGB materials in every block and the mosaic disposition (FIG. 10) are considered suitable to such requirement of the soft and fine picture.

When the printing method or the electrodeposition method is used for a screen of audio-visual equipments such as a TV set, the productivity is excellent and thereby the making costs is low. However, picture quality naturally lowers because of the stripe disposition of the RGB materials.

A triangular disposition of the RGB materials per one block can be made easily by the photolithograph method using the pigment resist as shown in FIG. 11. However, when the RGB materials are disposed independently from each other as shown in FIG. 7 by the printing method, partially torn-off imperfect elements 6 are formed during the printing. These imperfect elements 6 can not satisfy a quality required for the RGB materials.

OBJECT AND SUMMARY OF THE INVENTION

An object of the present invention is to offer a color filter substrate and a making method therefor having the following features:

the cost of both materials and manufacturing equipments is low, and the number of making processes is reduced, and also process time is shortened, thus raising the industrial productivity and lowering costs;

the RGB materials form one block in the form of triangle; and high quality picture can be derived when the color filter substrate is used for a screen of audio-visual equipments such as a TV set.

In order to achieve the above-mentioned object, a color filter substrate of the present invention comprises:

a substrate; and a color filter provided on the substrate and including RGB patterns and a black matrix superimposed upon each other, the black matrix having a plurality of apertures aligned in a predetermined reference direction;

wherein improvement is that:

each of the RGB patterns has a substantially linear shape extended in a direction oblique to the reference direction.

In another aspect, the present invention is a method for making a color filter substrate, comprising the steps of:

making linear RGB patterns on a substrate along a predetermined direction oblique to one side of said substrate; and superimposing a black matrix on the RGB patterns.

Alternatively, the present invention is a method for making a color filter substrate, comprising the steps of:

making on a substrate a black matrix having a plurality of apertures; and superimposing linear RGB patterns on the black matrix along a direction oblique to a reference direction defined by said apertures.

The above-mentioned color filter substrate has an excellent quality of display. Further, this color filter substrate is easily made by the above-mentioned methods, thereby improving the productivity and saving costs.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

DESCRIPTION OF THE PREFERRED EMBODIMENT

Hereafter, a preferred embodiment of the present invention is described with reference to the accompanying drawings.

Figure 1:
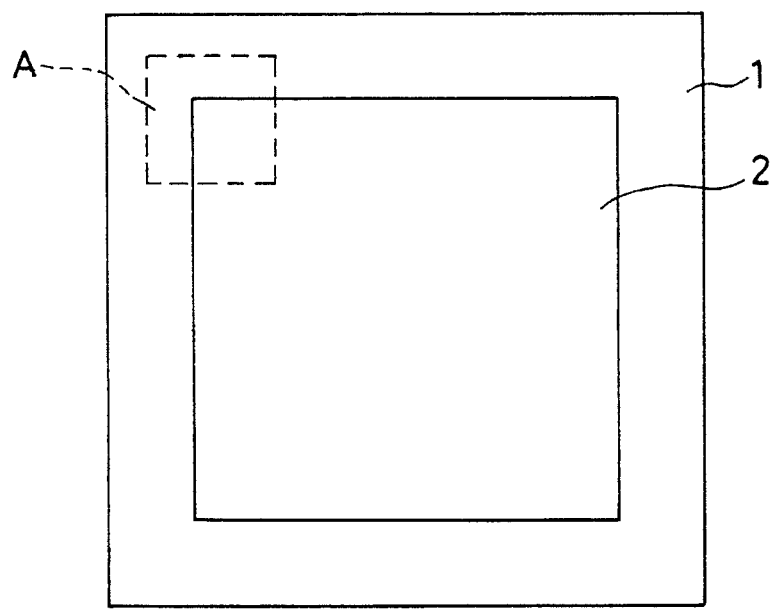
FIG. 1 is a plan view showing a color filter substrate.
Figure 2:
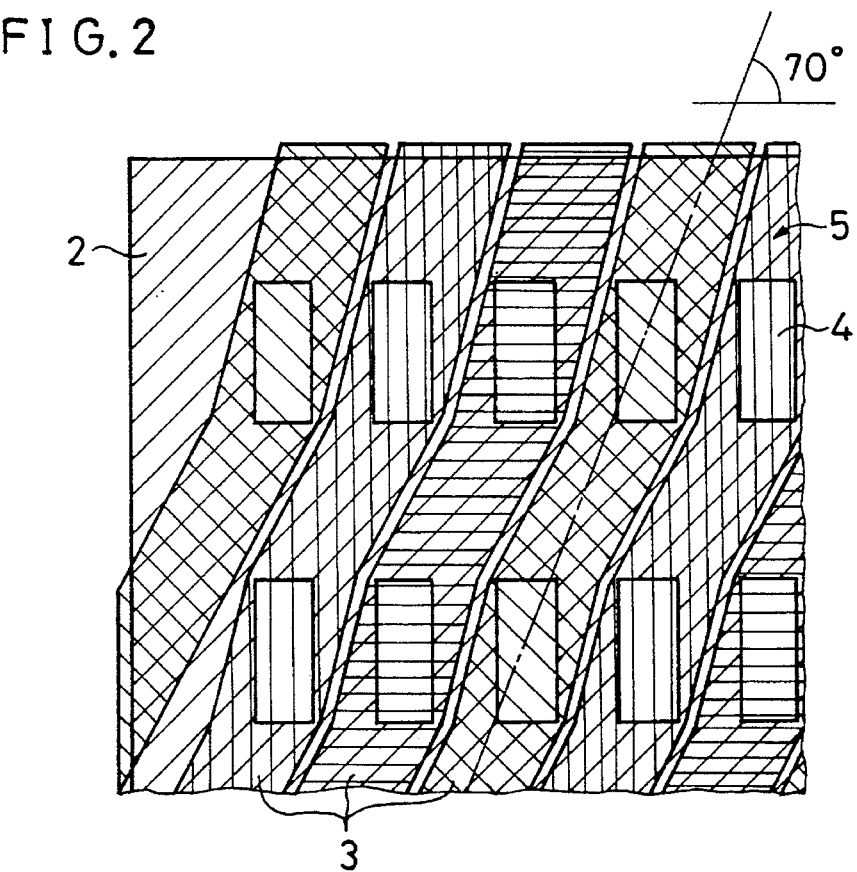
FIG. 2 is an enlarged plan view showing a part "A" in FIG. 1.

FIG. 1 is a plan view showing a color filter substrate, and FIG. 2 is an enlarged plan view showing a part "A" in FIG. 1.

In FIG. 1, a substrate 1 is made of glass of 1.1 mm in thickness, 300 mm in both length and breadth. A black matrix 2 is formed on an area defined by taking margins of 50 mm from respective sides of the substrate 1. This black matrix 2 is formed by painting a black pigment resist on the substrate 1 through the photolithograph method. In FIG. 2, plural apertures 4 are formed in the black matrix 2. Intervals of two apertures 4 adjacent to each other are 100 μm in breadth (left-right direction of FIG. 2) and 250 μm in length (upper-lower direction of FIG. 2). A breadth and a length of the aperture 4 are 50 μm and 120 μm, respectively. The aperture 4 is thus of rectangular shape, and respective sides forming each aperture 4 are aligned in parallel with or perpendicular to sides of the substrate 1 (FIG. 1). The apertures 4 are thus aligned to have a reference direction defined by the specific sides of the apertures 4.

Next, oblique RGB linear (substantially linear band shaped) patterns 3 are printed on the black matrix 2 by means of an offset printing. Each of these RGB linear patterns 3 is extended in a direction having a standard angle of 70° with respect to the reference direction defined by alignment of the widthwise sides of the apertures 4 and has a standard width 85 μm. A gradient and a width of each RGB pattern 3 are slightly changed in accordance with the location on the black matrix 2 so that the RGB pattern 3 can cover only the apertures 4 for a certain color. Each of the RGB patterns 3 has a continuous configuration from top to bottom within a useful area on the substrate 1 (FIG. 1). An interval between the same color patterns under the printing is 300 μm, and therefore an interval of every pattern of three colors is 100 μm.

Figure 4:
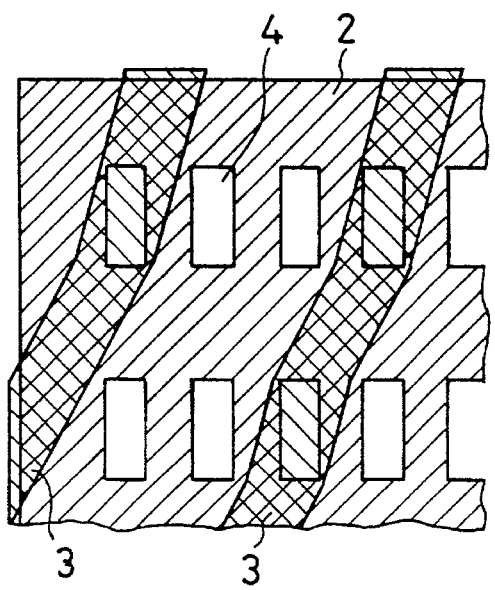
FIG. 4 is a plan view showing a state after printing of a first color pattern from a state of FIG. 3.
Figure 5:
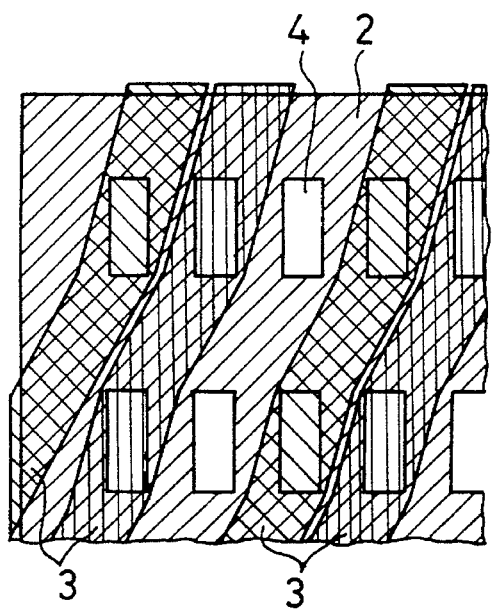
FIG. 5 is a plan view showing a state after printing of a second color pattern from the state of FIG. 4.
Figure 6:
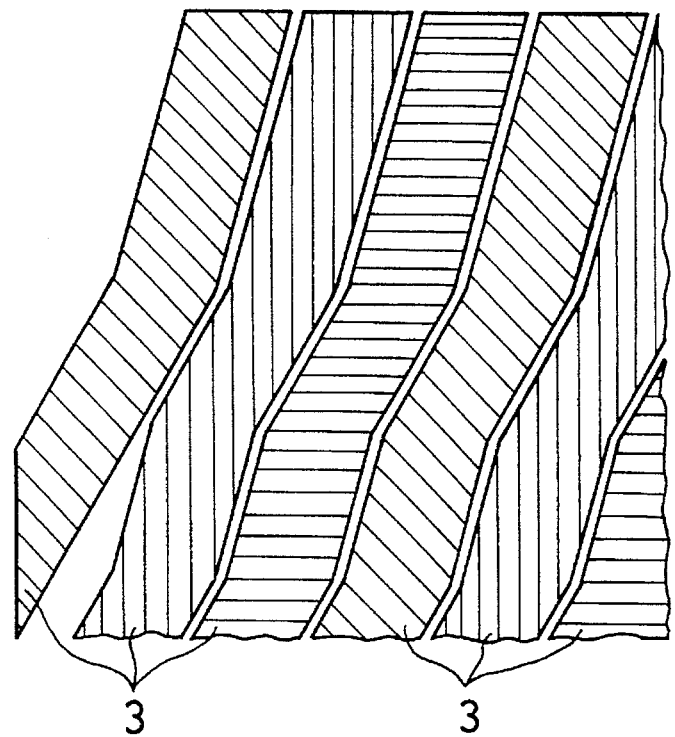
FIG. 6 is a plan view showing only oblique RGB linear patterns 3.

Next, making processes of the color filter substrate is described with reference to FIGS. 3, 4 and 5.

Figure 3:
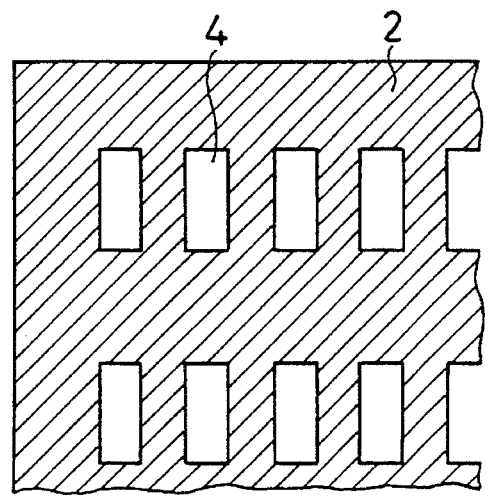
FIG. 3 is a plan view showing a black matrix 2 before printing of RGB patterns 3.

First, the black matrix 2 having apertures 4 disposed perpendicular to or parallel with the sides of the substrate 1 (FIG. 1) is formed on the substrate 1 as shown in FIG. 3. Next, a first color pattern of the oblique RGB linear patterns 3 (e.g., a red pattern) is printed on the black matrix 2 by means of the offset printing. Subsequently, a second color pattern is printed as shown in FIG. 5, and finally a third color pattern is printed, thus completing a color filter 5 (FIG. 2) having the RGB linear patterns 3 continuous from top to bottom and oblique to the side of the aperture 4 is formed on the substrate 1 as shown in FIG. 2.

Apart from the above-mentioned embodiment in which the black matrix 2 is formed on the substrate 1 and subsequently the RGB linear patterns 3 is superimposed on them, another embodiment may be such that:

The RGB linear patterns 3 are first formed on the substrate 1 along a predetermined direction oblique to one side of the substrate 1, and subsequently the black matrix 2 is superimposed on them. The inventor confirmed that an effect and a quality of display in the latter embodiment are equivalent to those of the former embodiment.

Although the offset printing is used in the above-mentioned embodiment, the relief printing or the like printing method can be used to obtain an effect equivalent to the offset printing.

Also, the angle of the RGB linear patterns 3 is selected to be 70° in the above-mentioned embodiment, another angle can be selected so as to be in harmony with the disposition of the black matrix. As to other specific values, other values can be selected too so as to be in harmony with the disposition of the black matrix.

Figure 7:
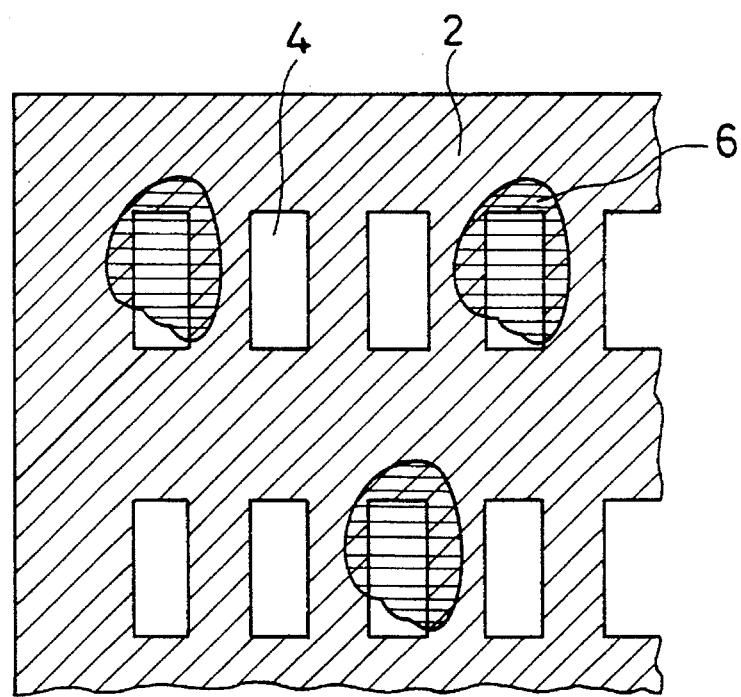
FIG. 7 is a plan view showing ink chips partially torn off in case the RGB patterns are printed in dot-shape.
Figure 8:
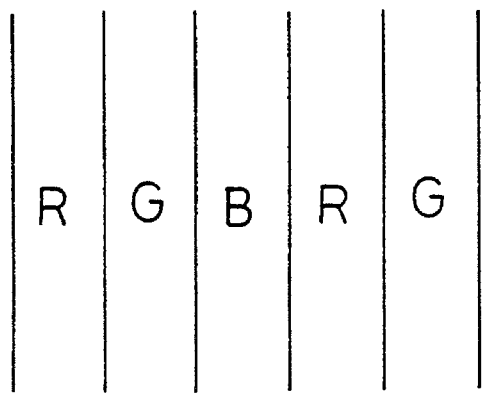
FIG. 8 is an illustration showing a disposition of the RGB element having the form of stripe.
Figure 11:
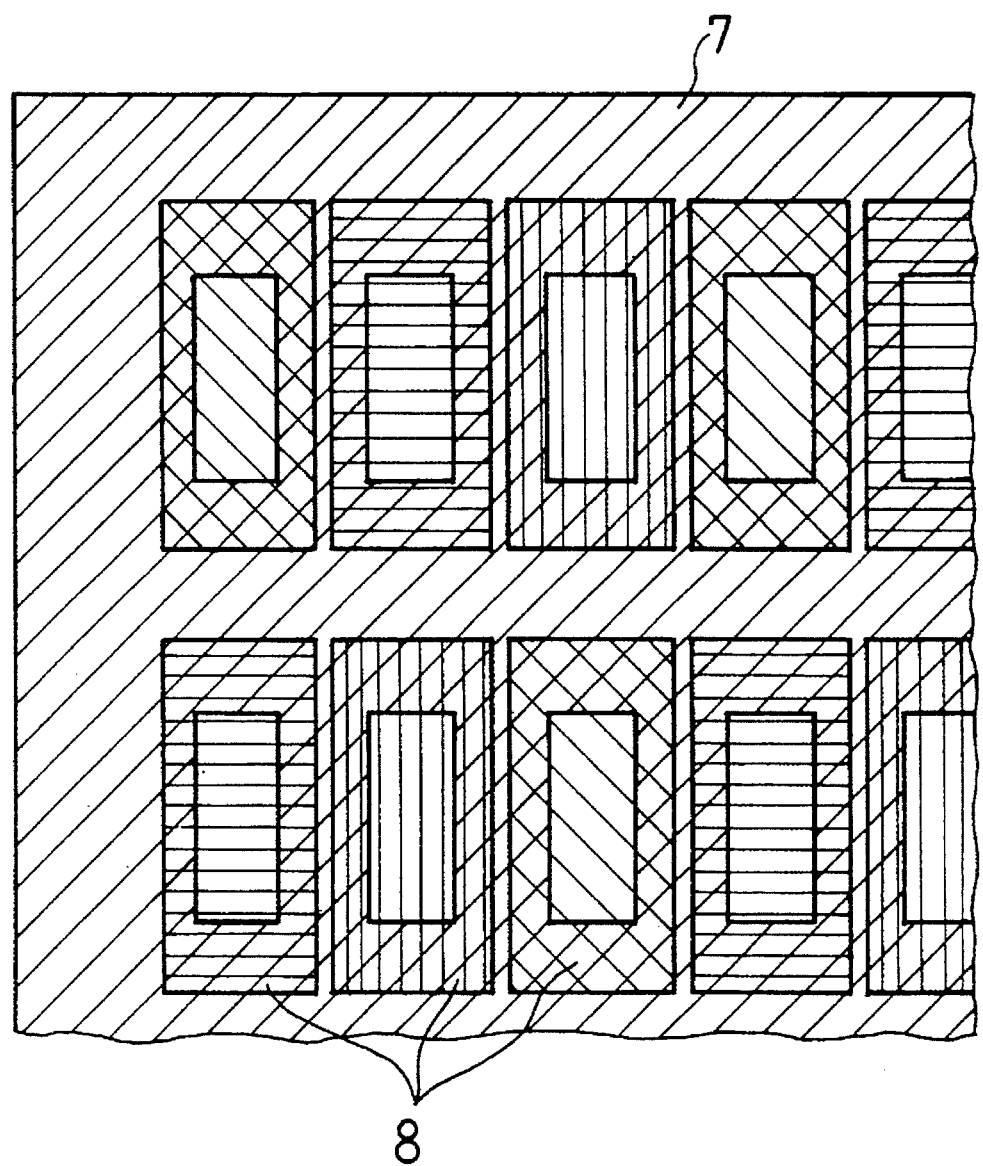
FIG. 11 is a plan view showing the conventional color filter.

Next, comparison is made on quality of display, working easiness in relation to the manufacturing yields and the productivity directly effecting on costs between the present invention (oblique RGB linear pattern by printing) and the prior art (the RGB pattern by the photolithograph method shown in FIG. 11, the RGB pattern by the stripe printing and the RGB dot-pattern by the printing method shown in FIG. 7).

In case the color filter substrate is used for the audio-visual equipment, the RGB patterns formed by the stripe printing are inferior to those made by other methods because of the inherent shortcomings of the stripe shape. However, according to other methods, the RGB patterns can be formed into an diagonal mosaic disposition or a delta (triangle) disposition, so that excellent quality of display is obtained.

In terms of easiness in making, the RGB dot disposition made by the printing method has a problem that ink chips 6 partially torn off are formed as shown in FIG. 7. Therefore, the color filter substrate of the RGB dot disposition by the printing method can not be applied to the practical use. The color filter substrate can be easily made by other methods without any trouble. In the present invention, torn-off of the ink does not occur due to the continuous linear-shaped configuration of the RGB patterns.

Respective methods are now compared with each other with respect to the number of production process which is an index of the productivity. For example, the photolithograph method necessitates six processes, i.e., washing, resist-coating, drying, exposing, developing and drying again to make one color pattern, whereas other methods using the printing necessitate only three processes of washing, printing and drying to make one color pattern. The number of production process for the printing methods are thus half the number required for the photolithograph method.

The following table 1 shows the comparison of respective methods:

TABLE 1

|  |  | Present invention Oblique RGB linear pattern by printing | Conventional methods | | |
|---|---|---|---|---|---|
|  |  |  | Photolithograph | Stripe printing | RGB dot printing |
| Factor on cost | Number of production process for one color | 3 ○ | 6 x | 3 ○ | 3 ○ |
| Quality of display | Possible disposition | Oblique mosaic Delta ○ | Oblique mosaic Delta ○ | Stripe x | Oblique mosaic Delta ○ |
| Easiness in making |  | ○ | ○ | ○ | Torn-off of ink x |
|  | Total evaluation | ○ | Δ | Δ | Δ |

○ ... Excellent
Δ ... Medium
x ... Inferior

The oblique RGB linear pattern of the present invention has an excellent quality of display and easiness of making. Further, since there is no need of a complicated processes such as painting, pre-baking, exposing, developing, rinsing and after-baking, a total processing time in the present invention is short. Further, the cost is low because materials are efficiently utilized.

Since the main process is the printing process, fees for materials and equipments are made low, and the number of production processes is small. Further, it is possible in the present invention to make a minute line about 15–20 μm with high preciseness.

Figure 9:
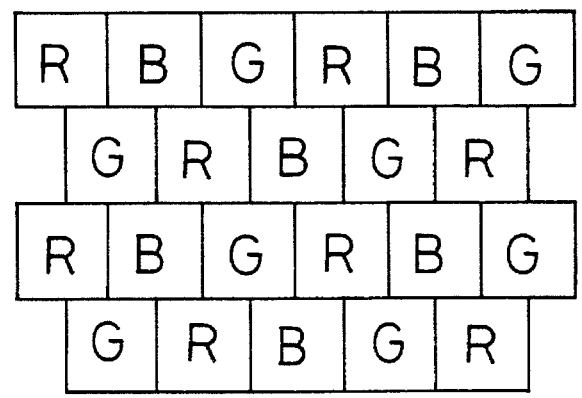
FIG. 9 is an illustration showing a disposition of the RGB element having the form of delta.
Figure 10:
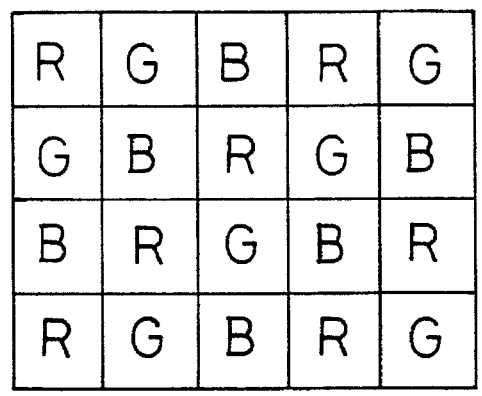
FIG. 10 is an illustration showing a disposition of the RGB element having the form of diagonal mosaic.

In the above-mentioned embodiment, a reference direction of the plural apertures in the black matrix is defined by the alignment of certain sides of the rectangular apertures 4 or one side of the substrate 1. However, the reference direction is not necessarily restrained by the above-mentioned relation. In any shape of the aperture, an aligning direction of the plural apertures can be a reference direction. Even if the alignment of the plural apertures is delta shape as shown in FIG. 9, the reference direction can be defined with reference to the apertures associated with each other.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A color filter substrate comprising:

a substrate; and a color filter provided on said substrate and including RGB patterns superimposed upon a black matrix, said black matrix having a plurality of apertures aligned in a predetermined reference direction:

wherein the improvement is that:

each of said RGB patterns is a substantially linear-shaped colored strip which is continuously extended in a direction oblique to said reference direction over said black matrix and wherein a plurality of said strips each covers at least two adjacent apertures.

2. A color filter substrate in accordance with claim 1, wherein said reference direction is defined by said apertures.

3. A color filter substrate in accordance with claim 1, wherein said reference direction is a direction substantially perpendicular to or parallel with a side of said substrate.

4. A color filter substrate in accordance with claim 1, wherein said RGB patterns are formed by a printing method.

5. A method for making a color filter substrate comprising the steps of:

making continuous, substantially linear RGB patterns on a substrate along a predetermined direction oblique to one side of said substrate; and superimposing a black matrix on said RGB patterns having apertures therein, wherein a plurality of said RGB patterns each covers at least two of said apertures adjacent to each other.

6. A method for making a color filter substrate comprising the steps of:

making on a substrate a black matrix having a plurality of apertures; and superimposing continuous, substantially linear RGB patterns on said black matrix along a direction oblique to a reference direction defined by said apertures, wherein a plurality of said RGB patterns each covers at least two of said apertures adjacent to each other.

7. A color filter substrate comprising:

a substrate; and a color filter provided on said substrate and including RGB patterns and a black matrix superimposed upon each other, said black matrix having a plurality of apertures aligned in a predetermined reference direction;

wherein the improvement is that:

said RGB patterns include a plurality of substantially linear-shaped strips each extended on said black matrix in a direction oblique to said reference direction to thereby cover a plurality of said apertures and a plurality of said strips each covers at least two adjacent apertures.

* * * * *